United States Patent [19]

Anand et al.

[11] Patent Number: 5,013,338
[45] Date of Patent: May 7, 1991

[54] PLASMA-ASSISTED POLYMERIZATION OF MONOMERS ONTO POLYMERS AND GAS SEPARATION MEMBRANES PRODUCED THEREBY

[75] Inventors: Madhu Anand, Allentown; Christine A. Costello, Easton; Keith D. Campbell, Slatington, all of Pa.

[73] Assignee: Air Products and Chemicals, Inc., Allentown, Pa.

[21] Appl. No.: 403,261

[22] Filed: Sep. 1, 1989

[51] Int. Cl.$^5$ ............................................. B01D 53/22
[52] U.S. Cl. ......................................... 55/158; 55/16; 427/40; 427/41
[58] Field of Search ............... 55/16, 68, 158; 427/40, 427/41

[56] References Cited

U.S. PATENT DOCUMENTS

| | | | |
|---|---|---|---|
| 4,212,719 | 7/1980 | Osada | 204/165 |
| 4,410,338 | 10/1983 | Yamamoto et al. | 55/158 |
| 4,483,901 | 11/1984 | Okita et al. | 55/158 X |
| 4,533,369 | 8/1985 | Okita | 55/158 |
| 4,581,043 | 4/1986 | van der Scheer | 55/158 X |
| 4,657,564 | 4/1987 | Langsam | 55/16 |
| 4,689,267 | 8/1987 | Takamizawa et al. | 55/158 X |
| 4,746,334 | 5/1988 | Matsui et al. | 55/158 |
| 4,759,776 | 7/1988 | Langsam et al. | 55/16 |
| 4,859,215 | 8/1989 | Langsam et al. | 55/158 X |

FOREIGN PATENT DOCUMENTS

| | | | |
|---|---|---|---|
| 0168133 | 1/1986 | European Pat. Off. | 55/158 |
| 51-72976 | 6/1976 | Japan | |
| 59-162904 | 9/1984 | Japan | 55/158 |
| 59-169507 | 9/1984 | Japan | 55/158 |
| 60-31802 | 2/1985 | Japan | |
| 60-122026 | 6/1985 | Japan | 55/158 |
| 60-257807 | 12/1985 | Japan | 55/158 |
| 61-078406 | 4/1986 | Japan | 55/158 |
| 62-125802 | 6/1987 | Japan | 55/158 |
| 62-286518 | 12/1987 | Japan | 55/158 |
| 01-007927 | 1/1989 | Japan | 55/158 |
| 1-030620 | 2/1989 | Japan | 55/158 |
| 1-063021 | 3/1989 | Japan | 55/158 |
| 1-067210 | 3/1989 | Japan | 55/158 |
| 2089285 | 6/1982 | United Kingdom | 55/158 |

OTHER PUBLICATIONS

J. Y. Lai et al, "Preparation of Vinylpyridine Irradiation–Grafted Poly(4–Methyl–Pentene–1) Membrane for Oxygen Enrichment", *J. Appl. Polym. Sci.*, 32, 5763 (1986).

Gong-Ho-Hsiue et al, "Preparation and Characterization of 4–Vinyl Pyridine-Grafted SBS Triblock Copolymer," *J. Appl. Polym. Sci.*, vol. 32, pp. 4615–4624 (1986).

H. Nishide et al., Japan Chem. Letter (CMLTAG) (1986).

N. Kawakami et al, "Modification of Gas Permeabilities of Polymer Membranes by Plasma Coating", *J. Membrane Sci.*, vol. 19, 249 (1984).

Y. Taniguchi et al, "PVA Derivative Selective to Oxygen from Nitrogen Gases", *Polymer Journal*, vol. 7, No. 4, pp. 519–520 (1975).

N. Yoshikawa, "Selective Permeation of Carbon Dioxide through Synthetic Polymer Membranes Having Pyridine Moiety as a Fixed Carrier", *J. Appl. Poly. Sci.*, vol. 35, 145–154 (1988).

M. Yoshikawa et al, "Selective Separation of Water from Water-Ethanol Solution through Quarternized Poly(4–Vinypyridine)-Co-Acrylnitrile) Membranes by Pervaporation Technique", *J. Appl. Poly. Sci.*, vol. 33, p. 2369 (1987).

T. Hirotsu, "Water-Ethanol Separation by Pervaporation through Plasma Graft Polymerized Membranes," *J. Appl. Poly. Sci., vol. 34, pp. 1159–1172 (1987)*.

J. Sakata et al, "Plasma-Polymerized Membranes and Gas Permeability III," *J. Appl. Poly. Sci.*, vol. 34, pp. 2701–2711 (1987).

*Primary Examiner*—Robert Spitzer
*Attorney, Agent, or Firm*—Mark L. Rodgers; William F. Marsh; James C. Simmons

[57] ABSTRACT

A composite of a rigid, glassy, permeable membrane of a silyl or germyl-containing polyacetylene and a thin surface layer of a plasma polymerized monomer having pendant nitrogen heterocycles is provided; the composite has high flux and selectivity and is particularly useful for separating gas mixtures containing at least two components having different permeabilities through the composite structure.

12 Claims, 1 Drawing Sheet

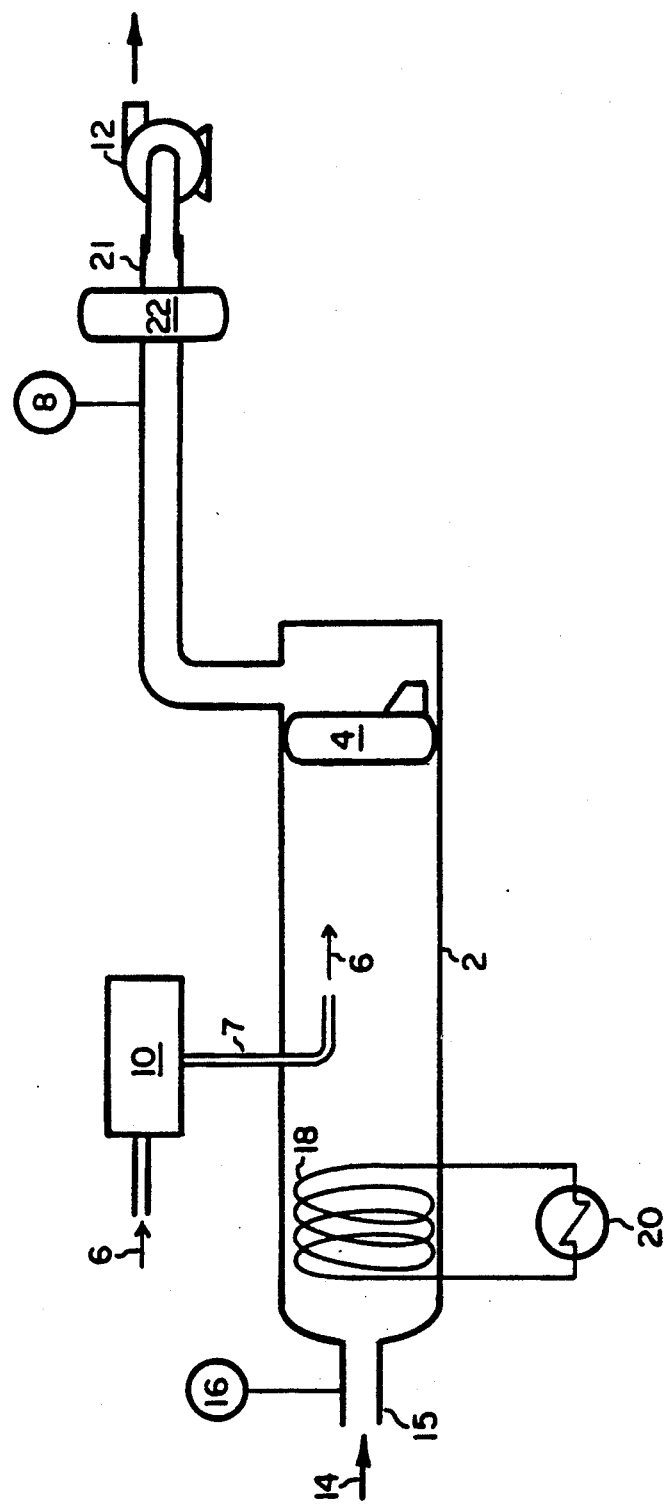

PLASMA-ASSISTED POLYMERIZATION OF MONOMERS ONTO POLYMERS AND GAS SEPARATION MEMBRANES PRODUCED THEREBY

FIELD OF INVENTION

This invention relates to the production of membranes with high selectivities and permeances for gas separation.

BACKGROUND OF THE INVENTION

Membrane-based gas separation/pervaporation systems offer significant energy savings over other gas separation systems such as distillation, adsorption, cryogenic separation, and the like. Unfortunately, there is often a trade-off between the permselectivity and permeability properties of polymeric membranes so that those membranes with the highest selectivities generally have very low permeabilities.

Attempts have been made to increase the separation factor or selectivities of prior polymeric membranes by incorporating separation selective moieties into the polymer surface. Of the many methods used for making such composite membranes, including irradiation grafting, plasma coating, copolymerization, and the like, plasma processes are the most interesting.

Thin polymeric layers can be deposited onto membrane supports by subjecting the support to reactive or polymerizable species generated in the plasma. The polymerizable species may be generated from conventional vinyl and acrylic monomers as well as their fluorinated derivatives. Monomers containing pendant nitrogen heterocycles (i.e. vinylpyridine, vinyl-imidazole, and vinylpyrrolidinone) are particularly interesting with respect to this invention. Some saturated molecules that do not undergo conventional polymerizations can also be plasma polymerized. Examples include saturated hydrocarbons, halocarbons, amines and fluoromines (e.g. perfluorotributylamine).

Although pinhole-free films can be produced when plasma polymerization is carried out under suitable conditions, the composite membranes thus produced do not possess sufficiently high selectivities for commercial applicability. When the reactive species is 4-vinylpyridine, for example, the resulting thin layer contains a great deal of cross-linking and seldom resembles material polymerized by more conventional routes. In general, if the substrate has a high permeability, then membranes possessing attractive composite properties can be fabricated when a thin layer of a highly selective but low permeability material is plasma-deposited on the surface.

Using existing permeability data, one can choose the most desirable thin layer for plasma-deposition onto a polymeric membrane substrate. Because poly (4-vinylpyridine) and other polymers with pendant nitrogen heterocycles exhibit extremely high selectivity ($\alpha O_2/N_2 = 12.2$ for poly(4-vinylpyridine)), they would be the thin layer of choice. However, the permeability of 4-vinylpyridine polymers is extremely low ($PO_2 = 2.8$ barrers). Efforts to incorporate the pyridine moiety into polymers known to have good permeability in order to increase their selectivity have not resulted in commercially acceptable membranes.

For example, Lai et al., *J. Appl. Polym. Sci.*, 32, 5763 (1986) describe gamma radiation-induced graft polymerization of a poly(4-methylpentene) substrate soaked in a solution of 4-vinylpyridine. This is a bulk modification that would lead to an interpenetrating polymer network. Likewise, Hsuie et al., *J. Appl. Polym. Sci.*, 32, 4615 (1986), Nishide et al., Japan Chem. Lett., (CMLTAG) (1986), and Sumita, Japanese Patent No. 51-72976 teach bulk modification to incorporate the vinylpyridine moiety into substrate polymers.

On the other hand, Kawakami et al., *J. Membrane Sci.*, 19, 249 (1984) describe the synthesis of composite membranes made from "rubbery" substrates and thin films of plasma polymerized "monomers" such as pyridine, 4-vinylpyridine, 2-vinylpyridine, perfluorotributylamine, vinylpyrrolidinone, and the like. This reference specifically demonstrates that plasma-polymerizing such monomers onto "stiff" supports, such as polysulfones and polyurethanes results in a plasma deposit that is liable to crack or separate from the substrate due to internal stress arising from the formation of cross-linkages and/or oxygenation after deposition. Accordingly, Kawakami et al. teach that only substrates of high flexibility, such as natural rubber or silicone rubbers, should be used as a substrate. However, highly flexible, hence soft and rubbery substrates such as polydimethylsiloxanes (the best polymer disclosed by Kawakami et al.) are not sufficiently permeable to be commercially attractive. A higher permeability material is required.

SUMMARY OF INVENTION

It has now been found that a composite of a rigid, glassy, semi-permeable membrane of polymer of a silyl or germyl-containing acetylene containing a thin surface layer of a plasma polymerized monomer having pendant nitrogen heterocycles provides a high selectivity system for the separation of gases at high flux.

Preferred silyl or germyl-containing acetylene semi-permeable membranes are prepared from polymers having the general formula:

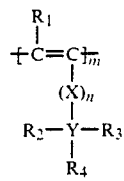

wherein X is phenylene or a $C_1$–$C_3$ alkyl group, Y is Si or Ge, $R_1$ is a linear or branched $C_1$–$C_4$ alkyl group, $R_2$ and $R_3$ are independently linear or branched $C_1$–$C_6$ alkyl groups, $R_4$ is a linear or branched $C_1$–$C_{12}$ alkyl group or aryl group, m is at least 100, and n is 0 or 1.

A wide variety of gas streams or mixtures containing at least two components having different permeabilities through the composite membrane can be separated by bringing the gas stream or mixture into contact with the composite membrane.

A process for preparing the composite membranes of the invention comprises exposing a semi-permeable membrane of a silyl or germyl-containing polyacetylene to vapors of a monomer containing pendant nitrogen heterocycles and plasma polymerizing the monomer onto the surface of the semi-permeable membrane.

BRIEF DESCRIPTION OF THE DRAWING

The Figure is a schematic representation of a plasma polymerization apparatus utilizing a radiofrequency transmitter operated at 13.56 MHz with a 1000 W capacity as a power supply.

DETAILED DESCRIPTION OF THE INVENTION

The semi-permeable membranes used in the invention are prepared from silyl or germyl-containing polyacetylenes as described in U.S. Pat. Nos. 4,657,564 and 4,759,776, the disclosures of which are hereby incorporated by reference. The silyl and germyl polymers have the general formula:

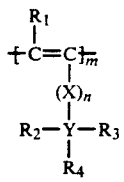

wherein X is phenyl a $C_1$-$C_3$ alkyl group, Y is Si or Ge, $R_1$ is a linear or branched $C_1$-$C_4$ alkyl group, $R_2$ and $R_3$ are independently linear or branched $C_1$-$C_6$ alkyl groups, $R_4$ is a linear or branched $C_1$-$C_{12}$ alkyl or aryl group, m is at least 100, and n is 0 or 1. Preferably, $R_1$, $R_2$, and $R_3$ are methyl and $R_4$ is a linear or branched $C_1$-$C_{12}$ alkyl group.

These polyacetylenes can be produced by any conventional polymerization techniques capable of synthesizing this type of polymer, for example, by polymerizing monomer units in an organic solvent using a suitable catalyst such as $TaCl_5$, $MoCl_5$, $NbCl_5$, and the like. While the polymer can have a wide range of molecular weights wherein m is at least 100, for handling and synthesis purposes it is preferred that m is less than 50,000.

After it is synthesized, the polymer is cast into membrane form using any suitable technique. The membrane can be a conventional dense self-sustaining flat sheet, an asymmetric sheet or fiber, a hollow fiber, a spiral wound flat sheet, a spiral wound coated sheet, a thin film composite or any other suitable membrane produced by any other suitable membrane fabrication technique.

For the purpose of this invention, self-supporting, flat sheet dense membranes were prepared by casting on a smooth surface; i.e., the film was cast by pouring the polymer solution onto glass. The solution was dried by using a stream of dry nitrogen for several days. The dense membranes obtained were thirty to sixty microns thick.

The untreated rigid, glassy polyacetylene membrane generally has high permeability values for a wide range of gases, but typically exhibits relatively poor gas selectivity, making it typically unsuitable for many gas separation operations. Further, because the membrane is rigid and glassy, it would be expected that any plasma deposit would crack or separate from the substrate due to internal stresses which arise from formation of cross-linkages and/or oxygenation after deposition (see Kawakami et al., *J. Membrane Science*, 19, 249-258 (1984)). It would also be expected that the selectivity of the rigid and glassy membranes of the invention could not be enhanced by the deposition of 4-vinylpyridine, 2-vinylpyridine or perfluorotributylamine without markedly lowering permeability as specifically taught by Kawakami et al. Indeed, the glass transition temperatures (Tg) of the glassy membranes from which the composite membranes of the invention are prepared are so high that the membranes decompose before the glass transition temperature is reached. Thus, the extremely stiff chained, very high Tg polymers of the invention would not be expected to be candidates for deposition by a plasma process in view of the Kawakami et al. disclosure.

Nevertheless, it has been found that the selectivity of a specific class of semi-permeable membranes prepared from a specific class of polymers; i.e. silyl and germyl-containing polyacetylenes, can be increased by exposing such membranes to a vapor of a monomer containing pendant nitrogen heterocycles and plasma polymerizing the monomer onto the membrane surface. It is preferred to deposit the thinnest possible defect-free layer of polymerized monomer although any desired thickness can be prepared. Generally, submicron thicknesses are commercially desirable ranging from about 0.5 micron to about 100A.

Any suitable monomer containing pendant nitrogen heterocycles can be used to form the surface layer of the composite membrane of the invention including pendant pyridine-containing acetylenic compounds, 4-vinylpyridine, 2-vinyl-pyridine, vinylpyrazine, vinylimidazole, vinyl-2-pyrrolidone, methyl-2-pyrrolidone, and the like and mixtures thereof.

Any monomer used is preferably devoid of oxygen and water. To insure permeation stability of the composite membrane over time, it is preferred that the monomer be purified prior to use. Any suitable purification technique can be employed. Preferably, the monomer is distilled from a suitable drying agent such as calcium hydride or the like, preferably at a reduced pressure. Generally, it is advantageous to distill the monomer at from about 5 to about 10 mmHg.

If stored, the monomer should be maintained under an inert atmosphere at a low temperature in an inert, air-tight container to maintain purity and prevent autopolymerization. Any suitable inert atmosphere (argon, nitrogen, helium, and the like and mixtures thereof) can be employed at any suitable temperature. Generally, temperatures such as those found in commercial freezers are suitable. The air-tight container is preferably glass. As used herein, the term "inert" refers to the action of the atmosphere with respect to the monomer.

In applying the monomer to the rigid, glassy membrane substrate, any suitable gas can be used as a carrier for the monomer, including nitrogen, argon, helium and the like and mixtures thereof. Argon is preferred. Generally, the carrier is purified by passage through a purification column to remove oxygen and water. Any other treatment or treatments that will remove oxygen and water can be used as desired.

The substrate membranes of the invention, when plasma treated, form a composite which includes the substrate membrane or base material and the plasma-deposited layer. The composite can be produced by any suitable plasma process including plasma deposition, plasma-assisted polymerization, plasma-initiated polymerization and the like.

Plasma deposition can be carried out in any number of ways as described, for example, in U.S. Pat. No. 4,533,369, the disclosure of which is hereby incorporated herein by reference. Some plasma deposition techniques include deposition in the glow region in which the substrate is placed in the glow region and the glow is created by monomer vapor mixed with an inert diluent, deposition in the dark region in which the substrate is placed downstream of the glow (i.e. the dark region) and the glow is created by monomer or monomer in an inert diluent, and monomer introduced downstream of the glow/deposition in the dark region in which monomer (and inert diluent) are fed to the reactor downstream of the glow (substrate is also in the dark region).

Another plasma polymerization technique involves exposing the substrate to a plasma of a carrier gas such as argon or nitrogen to create reactive sites. This is followed by passing a stream of monomer vapor (or diluted monomer vapor) over the reactive substrate, effecting a grafting reaction of the monomers onto the support. This process is sometimes referred to as plasma initiated polymerization, also described in U.S. Pat. No. 4,212,719, the disclosure of which is hereby incorporated herein by reference.

There are problems inherent in these processes, however. The deposition of the plasma polymer on reactor walls and plumbing downstream of the reactor is extremely disadvantageous. With the dynamic low pressure monomer flows described above, polymer builds up appreciably in the reaction chamber. Further, because of the problems involved in maintaining a uniform reactant concentration in the deposition area, nonuniform polymerization and powder formation occur.

The unique process of the invention obviates or alleviates these problems. The silyl or germyl-containing polyacetylene polymer support of the invention is exposed to monomer, or diluted monomer vapor, for a fixed length of time. The substrate sorbs the monomer vapor at its surface. The flow of monomer to the substrate is turned off and the plasma lit with a typical carrier gas at the desired conditions of flow rate, power, pressure, and reaction time (substrate can be placed in either the dark or glow region). After the reaction, the by-products and the unreacted starting materials are removed by sweeping the reactor with the carrier gas in the absence of a glow. This novel process maintains a high concentration of reacting monomer in the vicinity of reactive sites on the substrate, thus greatly reducing powder formation. In addition, because polymerization only occurs at the substrate, there is little, if any, polymer deposition on the reactor walls and downstream of the reactor.

The novel plasma assisted polymerization process of the invention thus allows much more uniform plasma surface treatment polymerization compared to conventional plasma polymerization techniques. The flexibility of the process can also be increased by controlling the sorption and desorption times for the monomer which affect the thickness of the modified layer.

Referring to FIG. 1 in a preferred process, a membrane substrate 4 prepared from the extremely permeable silyl and/or germyl polyacetylene polymers of the invention is placed in a plasma reactor 2 and exposed to a vapor of purified monomer 6 via vapor inlet 7 for a time ("sorb" time) ranging from several seconds to several hours, generally from about fifteen seconds to about two hours, preferably from about one minute to about one hour, most preferably from about three to about thirty minutes. Short sorb times provide composite films with high permeability and selectivity values. Longer sorb times provide no additional advantages. The pressure of the monomer vapor is measured by pressure gauge 8 and is controlled, preferably at between about 0.025 and 0.500 torr during the exposure period (sorb time) using a mass flow controller 10 and vacuum pump 12. A mass flow meter can be used to maintain monomer vapor flow which is the key to achieving significant increases in $PO_2/l$ (flux) while still maintaining selectivities greater than about 6. When the required level of sorption is reached, the reactor is purged by flowing any suitable carrier gas 14 such as nitrogen, argon, or the like through the plasma reactor 2 for a suitable length of time depending upon the system dynamics, which flow is monitored by pressure gauge 16 positioned along the reactor inlet 15. In our experiments the typical deposition time was from ten to fifteen minutes.

Thereafter, a plasma is lit using an electrode 18 and radio frequency generator 20. Any pressure or power setting that creates a glow can be used but, preferably, high power plasma conditions are employed, most preferably, 100 to 300 watts are used for a reactor as shown in the Figure. Any pressure that sustains the glow can be used, preferably from about 0.05 to about 1 torr, most preferably 0.1 to 0.5 torr. The reaction time can range from several seconds to several hours, generally from about thirty seconds to about two hours. From about five minutes to about an hour is preferred, but a range of from about ten minutes to about thirty minutes is most preferred. Longer reaction times provide no additional advantages. These conditions yield composite membranes having higher composite selectivities and permeabilities than were heretofore obtainable, particularly from rigid, glassy membrane substrates. A liquid nitrogen trap 22 is positioned along the reactor outlet 21 to prevent monomer from entering the vacuum pump 12.

The plasma may be generated using a conventional radio-frequency source which may be coupled inductively or capacitively. The capacitively coupled electrodes may be placed in contact with the plasma or external to the reactor. Also, the activation source may be placed upstream or downstream of the reaction zone. The radio-frequency excitation may be replaced by a microwave, audio frequency, DC or any other excitation that is known in the art to generate a plasma. Activation using an electron beam, X-rays, UV radiation source, corona discharge, ultrasonic devices, lasers and the like would also be possible.

The process for the preparation of the composite membrane of the invention provides a highly oxygen selective layer on a highly permeable substrate. As the selective layer is made increasingly thinner, the flux through the composite membrane increases without a sacrifice in selectivity of the modified layer. Economically, this is an extremely attractive system. Using plasma to provide the surface layer yields homogenous pinhole-free thin films. In general, the thinner the defect-free film, the better.

Unexpectedly, the polymerized monomer layer increases the selectivity of the membrane without adversely affecting permeability and resists cracking or separation from the substrate in spite of the fact that the substrate membrane is rigid and glassy in nature. The mechanism by which these unexpected results of the invention are achieved is not completely understood. However, it is believed that the surfaces of the semipermeable membranes of the invention are so uniquely and unexpectedly compatible with the deposited polymerized monomer surface layer that the internal stresses and cross-linking and/or oxygenation after deposition, observed for other rigid, glassy substrates, do not arise.

Gas Separation

The composite membranes of the invention exhibit greatly enhanced permselectivity for various gas mixtures, making them useful in many different gas separation operations. A gas stream containing two or more components is brought into contact with the membrane, and the permeate stream from the membrane is analyzed and measured to determine the permeability coefficient ($\bar{P}$) of the various gaseous components. The permeability coefficient can be calculated from the following relationship:

$$P = \frac{J}{1} \cdot \frac{1}{A} \cdot \frac{L}{1} \cdot \frac{1}{\Delta p}$$

where J is flux, A is area, L is thickness, $\Delta p$ is the pressure drop across the membrane. This relationship can be conveniently expressed in units of measurement termed Barrers. The relationship for Barrers is $$P = \text{in} \frac{\text{Sec}}{\text{Sec}} \cdot \frac{1}{\text{cm}^2} \cdot \frac{\text{cm}}{1} \cdot \frac{1}{(\text{cm})\text{Hg}} \cdot 10^{+10}$$

Additionally, the permeability of the composite membranes of the invention is quite high. Permeance (P/l), as defined by Henis and Tripodi in their paper on series-resistance models, *J. Memb. Sci.*, 8, 223, (1981), of the composite structure is measured taking into account the area of the very thin surface layer. By comparing the permeability and/or permeance values for different gaseous components, a selectivity ($\alpha$) ratio for various gas mixtures can be calculated. The composite membranes of the invention have significantly increased selectivities for a large number of gas mixtures. In addition to $O_2/N_2$, large numbers of other gas mixtures can be separated by this invention including $He/CH_4$, $He/N_2$, $H_2/CH_4$, $H_2/CO$, $H_2/N_2$, $CO_2/CH_4$, and the like. While the selectivity ratios of the gas mixtures demonstrated a significant increase, it is expected that many other gas mixtures, both binary and multi-component mixtures, would also exhibit increased selectivity ratios.

While the mechanism by which the invention works is not completely understood, it is hypothesized that oxygen interacts reversibly with the nitrogen-containing heterocycles, facilitating transport through the composite membrane of the invention. In addition, the plasma polymerized films are believed to be extensively cross-linked, forming a more selective network capable of separating oxygen from nitrogen. The composite membranes of the invention provide high flux through the thin layer of plasma polymerized monomer on the highly permeable substrate.

The invention is further illustrated but is not intended to be limited by the following examples in which all parts and percentages are by weight unless otherwise specified. Gas permeation measurements are made in a CS-135 Permeation Cell (Custom Scientific) in which pressurized gas mixtures are passed over the membrane surface and the permeate stream is measured on the permeate side using a volumetric flow device according to ASTM test procedure D-1434.

EXAMPLE 1

Plasma Polymerization

A polytrimethylsilylpropyne (PTMSP) polymer is prepared as described for Run Number 3 in Table 1 of U.S. Pat. No. 4,657,564. About 30 g of a 1.75% solution of PTMSP polymer in toluene were poured onto a smooth glass surface and air dried under a stream of dry nitrogen for 48 hours. A substrate membrane or film having a thickness of about 50 microns was obtained.

The substrate was then placed in a plasma reactor as shown in the Figure and the reactor was evacuated to 0.01 torr for about 1 hour. The reactor pressure was then brought up to 0.1 torr with vapor of vinylpyrazine monomer previously purified by distillation at 5 mmHg from calcium hydride and stored in a dark commercial freezer under nitrogen. The monomer was diluted with argon to 0.4 torr pressure argon. Monomer vapor was flowed into the reactor. The pressure inside the reactor ranged between about 25 and 50 millitorr.

A plasma was lit at 200 watts power for about 20 minutes. Thereafter, argon, purified through an Oxyclear® disposable gas purifier (Model D6P-250-R1), was flowed through the reactor for about ten minutes at 0.5 torr before the resulting composite membrane was removed from the reactor. The membrane was floated off the glass with distilled water, dried, and mounted in a gas permeation testing cell.

The permeability ($PO_2$ and $PN_2$) and selectivity ($\alpha$), defined as $PO_2/PN_2$ of the plasma treated membrane or composite of unmodified base material and plasma deposited layer were:

$PO_2 = 12.2$ Barrers
$PN_2 = 0.30$ Barrers
$\alpha = 8.5$

The intrinsic properties of the modified layer can be calculated from the permeability data for the untreated substrate membrane film and for the treated or composite membrane using a series-resistance model. The permeance (P/l) of the plasma polymerized monomer layer is given by:

$$\left[ \frac{P_t}{T} = \frac{1}{P_c} - \frac{1}{P_b} \right]^{-1}$$

where t refers to the plasma polymerized monomer layer, c refers to the composite membrane, and b refers to the untreated substrate.

The intrinsic $O_2/N_2$ selectivity of the plasma polymerized monomer layer is given by:

$$\alpha_{N_2}^{O_2} = \frac{P_t O_2/l}{P_t N_2/l}$$

where $P_tO_2/l$ and $P_tN_2/l$ are the calculated $O_2$ and $N_2$ permeances, respectively, of the plasma polymerized layer.

Thus, for the instant example, the intrinsic properties of the plasmadeposited layer are:

$PO_2/l = 0.0231 \times 10^5$ Barrers cm$^{-1}$
$\alpha(O_2/N_2) = 8.6$ since the properties of the (PTMSP) substrate membrane are:

$PO_2 = 8288$ Barrers
$PN_2 = 6122$ Barrers
$\alpha(O_2/N_2) = 1.4$

EXAMPLE 2

Plasma Assisted Polymerization

Substrate membrane films prepared as described in Example 1 were placed in the reactor of the Figure. The reactor was evacuated to about 0.01 torr after being flushed with argon, purified as described in Example 1, for about 10 minutes. Monomer was purified as described in Example 1; vapor from above the liquid was then flowed through the reactor as indicated in Table 1. When sorption was completed, the reactor was purged with 0.5 torr argon (purified as described in Example 1) for ten minutes. Plasma was lit using 0.5 torr of argon purified as described in Example 1 as the carrier gas. Reactor parameters are given in Table 1. At the end of the reaction, argon was flowed through the reactor for about ten minutes at 0.5 torr to sweep reaction by-products and unreacted monomer out of the system before the product composite membrane was removed. The composite membrane was then floated off of the glass and dried as described in Example 1.

TABLE 1

Reaction Conditions for Plasma Assisted Polymerization

| | | Sorb Conditions | | Plasma Conditions | | |
|---|---|---|---|---|---|---|
| Sample Number | Monomer Used | Sorb Time (Minutes) | Monomer Pressure (Torr) | Power (Watts) | Ar Pressure (Torr) | Reaction Time (Minutes) |
| 1 | VPyrz | 15 | 0.1 | 200 | 0.5 | 20 |
| 2 | 4VPy | 30 | 0.5 | 200 | 0.5 | 10 |
| 3 | 4VPy | 30 | 0.5 | 300 | 0.5 | 10 |
| 4 | 4VPy | 15 | 0.1 | 200 | 0.5 | 20 |
| 5 | 4VPy | 15 | 0.1 | 300 | 0.5 | 20 |
| 6 | VIm | 15 | 0.1 | 200 | 0.5 | 20 |
| 7 | VIm | 15 | 0.05 | 200 | 0.5 | 20 |
| 8 | VIm | 15 | 0.05 | 300 | 0.5 | 20 |
| 9 | 2VPy | 15 | 0.250 | 200 | 0.5 | 25 |
| 10 | 2VPy | 3 | 0.250 | 200 | 0.5 | 5 |

VPyrz = vinylpyrazine
4VPy = 4-vinylpyridine
VIm = vinylimidazole
2VPy = 2-vinylpyrazine The permeability of these membranes is measured as described above. The data are summarized in Table 2.

TABLE 2

Permeation Data for Composite Membranes from Table 1

| | Composite Permeation Data | | | Intrinsic Layer Data | |
|---|---|---|---|---|---|
| Sample Number | $PO_2$ (Barrers) | $PN_2$ Barrers | $\alpha$ ($O_2/N_2$) | $PO_2/l$ $\times 10^{-5}$ (Barrers cm$^{-1}$) | $\alpha$ ($O_2/N_2$) |
| 1 | 2.56 | 0.30 | 8.5 | 0.0051 | 8.6 |
| 2 | 47.1 | 7.27 | 6.5 | 0.091 | 6.5 |
| 3 | 33.1 | 4.73 | 7.0 | 0.10 | 7.1 |
| 4 | 33.1 | 4.73 | 7.0 | 0.10 | 7.1 |
| 5 | 15.2 | 1.02 | 13.0 | 0.025 | 14.9 |
| 6 | 11.3 | 1.13 | 10.0 | 0.018 | 10.0 |
| 7 | 11.2 | 1.32 | 8.5 | 0.035 | 8.5 |
| 8 | 5.67 | 0.786 | 7.3 | 0.0099 | 7.3 |
| 9 | 18.3 | 1.54 | 11.9 | 0.037 | 12.0 |
| 10 | 95.2 | 10.0 | 9.5 | 0.19 | 9.6 |

Table 2 shows that plasma assisted polymerization of the monomers under rigorous conditions yielded composite membranes having much higher composite selectivities than would be expected for polymers having such a high Tg that they decompose before the Tg can be measured.

EXAMPLE 3

Plasma Assisted Polymerization

A substrate membrane prepared as described in Example 1 was placed in the reactor of the Figure. Monomer flow through the reactor was monitored with a mass flow controller to provide a very low, yet constant monomer flow throughout the sorb period as indicated in Table 3. A plasma was then lit at 200 watts power for 20 minutes using 0.1 torr argon as the carrier gas. Table 3 shows that, as the sorb time for a 2-vinylpyridine plasma assisted polymerization decreased, the $PO_2/l$ increased dramatically. It is interesting to note that with plasma assisted polymerization it is possible to achieve permeances two orders of magnitude greater than those obtained by conventional plasma poly- merization or deposition as illustrated by comparison between the data in Table 1 of the Kawakami et al. disclosure and Table 3 below. This is a completely unexpected result.

TABLE 3

Plasma Assisted Polymerization of 2-Vinylpyridine onto Poly(trimethylsilylpropyne)

| | | | Calculated Intrinsic Layer Properties | |
|---|---|---|---|---|
| Sample Number | Monomer Sorb Time (Minutes) | Composite Membrane Thickness (Microns) | $PO_2/l$ $\times 10^5$ Barrers cm$^{-1}$ | $\alpha$ ($O_2/N_2$) |
| 11 | 30 | 61 | 0.27 | 7.6 |
| 12 | 15 | 73 | 0.39 | 7.0 |
| 13 | 7.5 | 75 | 0.93 | 6.0 |
| 14 | 3 | 52 | 2.2 | 2.0 |

TABLE 4

Calculated Intrinsic Layer Properties of Plasma Modified Membranes From Kawakami et al. J. Membrane Sci., 19, 149 (1984)

| Substrate | Monomer | Flow Rate (Monomer/Ar) | Reaction Conditions Power (Watts) | Time (Minutes) | Calculated Intrinsic Property $PO_2/l \times 10^{-5}$ (Barrers cm$^{-1}$) | $\alpha$ ($O_2/N_2$) |
|---|---|---|---|---|---|---|
| SR | 4VP | 0.07 | 40 | 20 | 0.28 | 13.1 |
|    |     | 0.07 | 40 | 60 | 0.048 | 7.3 |
|    | 2VP | 0.07 | 40 | 20 | 0.13 | 9.4 |
|    |     | 0.7  | 40 | 60 | 0.061 | 8.2 |
| NR | 4VP | 0.07 | 40 | 20 | 0.023 | 12.0 |
|    |     | 0.95 | 37 | 40 | 0.04 | 15.8 |
|    | 2VP | 0.32/1.0 | 33 | 15 | 0.025 | 8.6 |
|    |     | 0.32/1.0 | 33 | 30 | 0.011 | 7.0 |

SR = Silicone rubber
NR = Natural rubber
4VP = 4-vinylpyridine
2VP = 2-vinylpyridine The significant increases in $PO_2/l$ values obtained while maintaining selectivities greater than 6 is remarkable. A key to such results is control of the amount of monomer vapor flowing through the reactor and short monomer sorb times in the plasma assisted polymerization method described here.

EXAMPLE 4

Composite membranes are prepared as described in Example 3 except that vinylimidazole was used as the monomer. The plasma was lit at about 200 watts for about 20 minutes using 0.1 torr argon, purified as described in Example 1, as the carrier gas. Results obtained are shown in Table 5.

TABLE 5

| Sample Number | Monomer Sorb Time (Minutes) | Composite Membrane Thickness (Microns) | Calculated Intrinsic Layer Properties $PO_2/l \times 10^{-5}$ (Barrers/cm$^{-1}$) | $\alpha$ ($O_2/N_2$) |
|---|---|---|---|---|
| 15 | 30  | 65 | 1.88 | 6.2 |
| 16 | 7.5 | 60 | 3.08 | 6.3 |
| 17 | 3.0 | 60 | 0.46 | 8.1 |

The results show that higher calculated $PO_2/l$ values can be obtained than those set out in Table 4 while still maintaining the selectivity at above about 6.

Although some preferred embodiments have been illustrated in the Examples, it is to be understood that any of the other components and conditions described herein can be substituted for its counterpart in the Examples with similar result. Further, while the invention has been described in considerable detail in the foregoing, it is to be understood that such detail is solely for the purposes of illustration. Variations can be made by those skilled in the art without departing from the spirit and scope of the invention except as set forth in the claims.

What is claimed is:

1. A composite of a rigid, glassy semi-permeable membrane produced by forming a substrate membrane from a silyl or germyl-containing polyacetylene polymer, exposing the substrate membrane to vapors of a monomer containing pendant nitrogen heterocycles for between 15 seconds and 15 minutes at a pressure from 0.025 to 0.5 torr such that said substrate sorbs monomer vapor, subsequently discontinuing the flow of monomer vapor and lighting a plasma with a carrier gas in the presence of said substrate at a power of from 33 to 300 watts and a pressure from 0.05 to 1 torr for 30 seconds to 2 hours, such that the monomer is plasma polymerized in-situ onto the surface of the substrate membrane.

2. The composite of claim 1 wherein the polyacetylene polymer has the general formula:

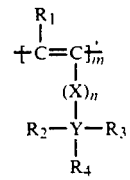

wherein X is phenylene or a $C_1$-$C_3$ alkyl group, Y is Si or Ge, $R_1$ is a linear or branched $C_1$-$C_4$ alkyl group, $R_2$ and $R_3$ are independently linear or branched $C_1$-$C_6$ alkyl groups, $R_4$ is a linear or branched $C_1$-$C_{12}$ alkyl or aryl group, m is at least 100, and n is 0 or 1.

3. The composite of claim 2 wherein the polyacetylene polymer has the formula:

$$\begin{array}{c} R_1 \\ | \\ +C=C\!\!\!+_m \\ | \\ (X)_n \\ | \\ R_2-Si-R_3 \\ | \\ R_4 \end{array}$$

wherein X is phenylene or a $C_1$-$C_3$ alkyl group, $R_1$ is a linear or branched $C_1$-$C_4$ alkyl group, $R_2$ and $R_3$ are independently linear or branched $C_1$-$C_6$ alkyl groups, $R_4$ is a linear or branched $C_1$-$C_{12}$ alkyl or aryl group, m is at least 100, and n is 0 or 1.

4. The composite of claim 3 wherein n=0.

5. The composite of claim 4 wherein $R_1$, $R_2$, $R_3$, and $R_4$ are methyl groups.

6. The composite of claim 2 wherein the polyacetylene polymer has the formula:

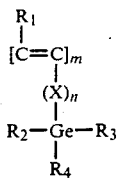

wherein X is phenylene or a $C_1$-$C_3$ alkyl group, $R_1$ is a linear or branched $C_1$-$C_4$ alkyl group, $R_2$ and $R_3$ are independently linear or branched $C_1$-$C_6$ alkyl groups, $R_4$ is a linear or branched $C_1$-$C_{12}$ alkyl or aryl group, m is at least 100, and n is 0 or 1.

7. The composite of claim 6 wherein $R_1$, $R_2$, $R_3$, and $R_4$ are methyl groups.

8. The composite of claim 2 wherein n=0.

9. The composite of claim 1 wherein the monomer is selected from the group consisting of pendant pyridine-containing acetylenic compounds, 4-vinylpyridine, 2-vinylpyridine, vinylpyrazine, vinylimidazole, vinyl-2-pyrrolidone, methyl-2-pyrrolidone, and mixtures thereof.

10. A process for producing a rigid, glassy semipermeable membrane, said process comprising: forming a substrate membrane from a silyl or germyl-containing polyacetylene polymer, exposing the substrate membrane to vapors of a monomer containing pendant nitrogen heterocycles for between 15 seconds and 15 minutes at a pressure from 0.025 to 0.5 torr such that said substrate sorbs monomer vapor, subsequently discontinuing the flow of monomer vapor and lighting a plasma with a carrier gas in the presence of said substrate at a power of from 33 to 300 watts and a pressure from 0.05 to 1 torr for 30 seconds to 2 hours, such that the monomer is plasma polymerized in-situ onto the surface of the substrate membrane.

11. The process of claim 10 wherein the monomer is purified before the substrate membrane is exposed thereto.

12. The process of claim 10 wherein the thickness of the plasma polymerized monomer layer ranges from about 100Å to about 0.5 micron.

* * * * *